May 3, 1927.
H. O. PARKER
REFINING OILS
Filed June 18, 1925
1,627,338
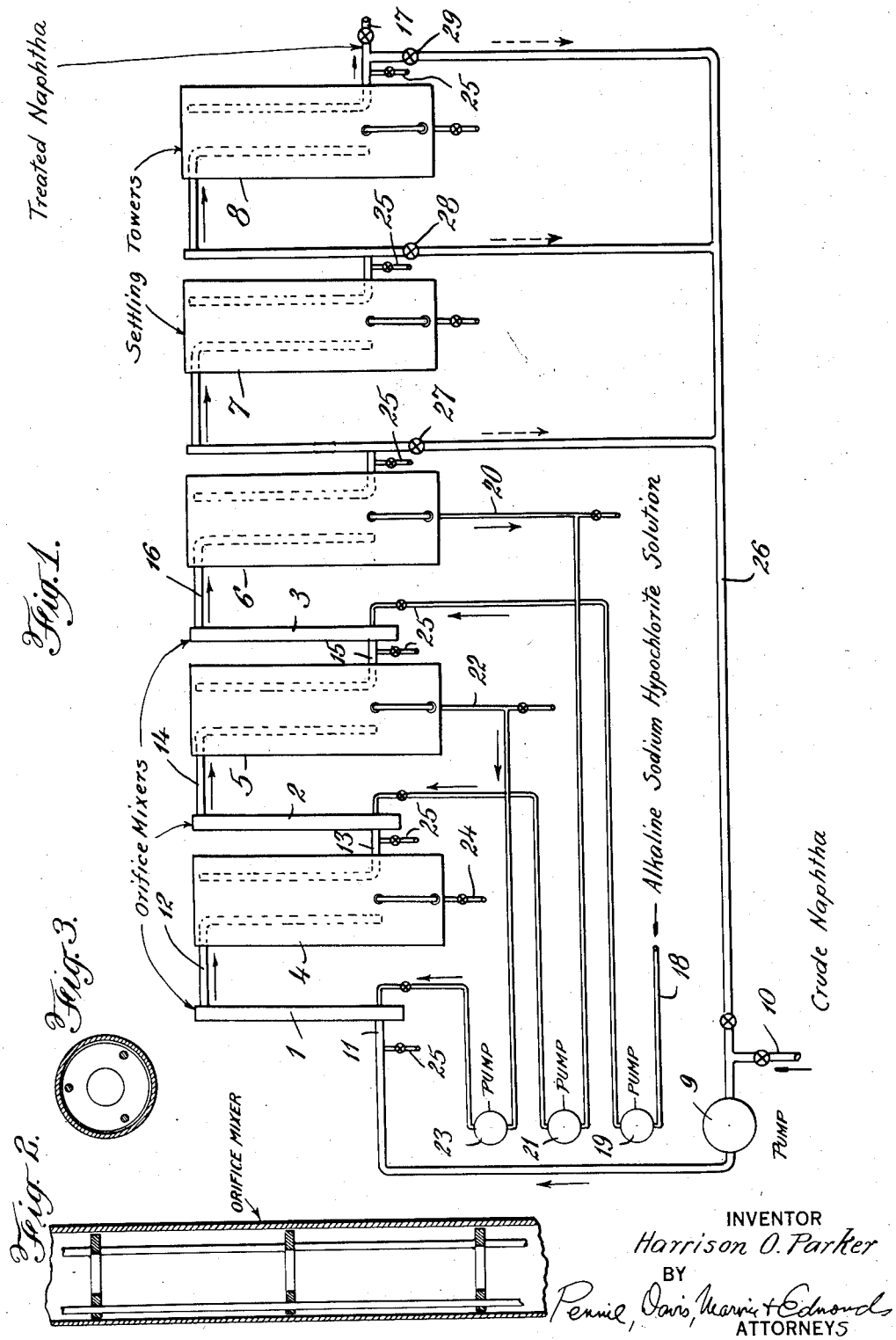
INVENTOR
*Harrison O. Parker*
BY
*Pennie, Davis, Marvin & Edmonds*
ATTORNEYS Patented May 3, 1927.

1,627,338

UNITED STATES PATENT OFFICE.

HARRISON OAKS PARKER, OF TULSA, OKLAHOMA, ASSIGNOR TO THE MATHIESON ALKALI WORKS, OF NEW YORK, N. Y., A CORPORATION OF VIRGINIA.

REFINING OILS.

Application filed June 18, 1925. Serial No. 37,888.

This invention relates to the refining of hydrocarbon oils, and particularly to the refining of light petroleum oils such as those of a naphtha character. Light petroleum oils may with advantage be refined by treatment with alkaline solutions of hypochlorites, and in connection with such refining operations it is advantageous to subject the oil to treatment with a solution of a caustic alkali prior to the hypochlorite treatment. This invention provides an improved method of carrying out refining operations of this character in which the oil to be treated is first subjected to treatment with a solution of a caustic alkali and then to treatment with an alkaline solution of a hypochlorite.

According to the present invention, a stream of the oil to be refined is flowed through a succession of mixing and settling operations and an aqueous refining solution containing a hypochlorite and free caustic alkali is first supplied to one of the later mixing operations, then separated from the oil in the succeeding settling operation and the separated aqueous solution again supplied to a mixing operation preceding that to which the aqueous solution is first supplied, the aqueous solution again being separated from the oil in the next succeeding settling operation. This operation may be repeated in two, three or more stages, the aqueous solution after separation from the oil being progressively re-introduced in mixing operations preceding in each instance that to which it was last supplied. The general flow of the refining solution is thus counter-current to the flow of the oil, but the refining operation is made up of a series of successive settling and mixing operations, the flow of the oil and of the refining solution being concurrent from each mixing operation to the succeeding settling operation. As the aqueous alkaline hypochlorite solution is successively re-contacted with the oil, its content of available chlorine is gradually and progressively consumed. The oil flowing through the refining operation is thus subjected first to treatment with a solution which may be substantially free from available chlorine but which contains free caustic alkali and then to treatment with an alkaline solution containing available chlorine, or successively to treatment with alkaline solutions containing available chlorine in progressively increasing amounts. The invention thus provides for treatment of the oil first with a solution of caustic alkali followed by treatment with an alkaline solution of a hypochlorite although only one refining solution is required to be made up and handled. The invention also provides for effective use both of the content of available chlorine and the caustic alkali content of the refining solution. The operation is particularly adapted for use in a continuous manner, and when so employed complete control of the operation can be had simply by control of the rate at which the initial refining solution is initially supplied in proportion to the rate at which oil to be treated is flowing through the operation.

The invention will be further described in connection with the accompanying drawings which illustrate in a diagrammatic way apparatus embodying the invention and adapted for use in carrying out the process of the invention, but it will be understood that this further description and illustration are for the purpose of exemplification and that the invention is not limited thereto.

Fig. 1 is a diagrammatic view of one form of apparatus suitable for carrying out the present invention.

Fig. 2 is a fragmentary view of the orifice mixer shown in Fig. 1.

Fig. 3 is a cross-section view of the orifice mixer of Fig. 2.

Referring to the drawings, the treating apparatus illustrated comprises a series of orifice mixers 1, 2 and 3, and a series of settling towers 4, 5, 6, 7 and 8. The oil to be treated is forced through the apparatus by means of a pump 9 from supply pipe 10. The oil enters the lower part of the first orifice mixer 1 through connection 11, flows from the upper end of this mixer to the lower part of the first settling tower 4 through connection 12, overflows from the upper end of this settling tower to the lower part of the second orifice mixer 2 through connection 13, flows from the upper end of this mixer to the lower part of the settling tower 5 through connection 14, overflows from the upper end of this settling tower to the lower part of the third orifice mixer 3 through connection 15, flows from the upper end of this mixer to the lower part of the settling tower 6 through connection 16, and then overflows successively through the two additional settling towers 7 and 8, the treated product being discharged through pipe 17. The orifice mixers diagrammatically illustrated may comprise a vertical tube provided interiorly with a series of baffles or apertured plates to promote mixing of the oil and the refining solution by the turbulence of the flow therethrough. The settling towers may be of conventional construction arranged to promote separation of the oil and the refining solution.

The refining solution, an aqueous alkaline sodium hypochlorite solution for example, is supplied through pipe 18 and by means of pump 19 is forced into the lower end of the mixer 3 together with the oil overflowing from the settling tower 5 through connection 15. The refining solution and the oil are thoroughly mixed as they rise through the mixer 3 and are separated as they are discharged into the settling tower 6 due to the greater density of the aqueous refining solution, the oil overflowing from the upper end of the settling tower and partly spent refining solution collecting in the lower end whence it is withdrawn through connection 20. This partly spent refining solution is then forced into the lower end of the mixer 2 together with the oil overflowing from the settling tower 4 by means of pump 21 and, after being thoroughly mixed with the oil in the mixer, is separated therefrom in the settling tower 5. The more completely spent refining solution collecting in the lower part of settling tower 5 is withdrawn from connection 22 and by means of pump 23 is forced into the lower end of the first mixer 1 together with the raw oil to be treated supplied by pump 9 through connection 11. The oil is thus subjected first to treatment with the most completely spent solution and then progressively with solutions containing a higher content of available chlorine. The chlorine available is consumed somewhat more rapidly than the caustic alkali so that by supplying an excess of caustic alkali the operation may be controlled so that the initial treatment is effected with a solution containing substantially no free chlorine but containing sufficient caustic alkali to effect the desired preliminary treatment.

After discharge from the mixer 1, the spent refining solution separated from the oil in the settling tower 4 is withdrawn through connection 24 and may be run to waste or to suitable recovery apparatus. The settling towers 7 and 8 are provided to promote complete separation of the refining solution from the oil. Test cocks are provided at 25 for withdrawing samples to provide for control of the operation. Incompletely refined oil may be returned for retreatment through connection 26 and recirculated through the treating apparatus by means of pump 9 by opening any of valves 27, 28 or 29.

The invention will be further illustrated by the following specific example of an operation carried out in accordance with the invention: About 800 to 1,000 barrels per hour of a crude naphtha from a southern Mexican crude oil were treated per hour with a consumption of from about 0.3 to 0.4 pounds of chlorine and about 0.6 to 0.8 pounds of caustic soda per barrel of oil, the operation being carried out continuously on a 24 hour per day schedule. Five settling towers were employed as in the apparatus illustrated 8 ft. in diameter and 20 ft. high. The orifice mixers employed were made up of 18 ft. lengths of 10" pipe within which discs having a central aperture about 4" in diameter were arranged on about 10" centers. Three such mixers were employed in parallel in the first stage and two in parallel in each of the succeeding mixing stages through which the oil was passed. An aqueous refining solution initially containing about 10 grams of available chlorine per liter, a sodium hypochlorite, and about 10 grams of free caustic soda per liter was employed. This refining solution was supplied to the third mixing stage of the treatment. The refining solution separated from the oil in the third settling stage of the treatment contained about 4 to 5 grams of available chlorine and about 8 to 10 grams of free caustic soda per liter and was employed in the second mixing stage of the treatment. The refining solution separated from the oil in the second settling stage contained substantially no available chlorine but contained about 8 to 10 grams of free caustic soda per liter and was employed in the first mixing stage of the treatment. The treated naphtha discharged from the fifth settling tower contained a very slight trace of caustic alkali which tended to settle out during storage. In the operation described, the oil was not subjected to any further washing or chemical treatment but was simply distilled with steam for the production of a finished naphtha of good color and odor and sweet to the "doctor test".

The foregoing example is given as an illustration of the practice of the invention but it will be apparent that several modifications could be made in carrying out the invention. For example, other hypochlorites such as hypochlorites of other alkali metals might be employed and the refining solution might be made alkaline with caustic soda or with other caustic alkalis. The amount of solution employed and the consumption of chlorine and of caustic alkali also varies in the treatment of different oils. Likewise, the treatment of the oil following treatment in accordance with this invention may be widely varied. For example, the oil may be subjected to a water wash, which might be carried out in the fourth or fifth settling tower in the apparatus illustrated, following the treatment with an aqueous alkaline hypochlorite solution, or it might be treated with an absorbent material such as fuller's earth or ignited bauxite, or subjected to distillation in the presence of an alkali such as caustic soda or with the use of ammonia.

In the treatment of crude naphtha from a southern Mexican crude as described in the foregoing example, it was found advantageous in the steam distillation of the treated oil to introduce ammonia into the oil undergoing distillation with the steam or to supply a solution of caustic soda to the still. In this particular case, with a daily throughput of 6,000 barrels of naphtha per still, about 48 lbs. of anhydrous ammonia per day was employed. Similarly, about 75 to 80 pounds of caustic soda per day could be employed. In such an operation, a trace of alkali in the oil supplied to the distillation from the chemical treatment is useful in the distillation.

I claim:

1. An improved method of refining hydrocarbon oils, which comprises flowing a stream of the oil through a succession of mixing and settling operations, supplying an aqueous alkaline solution of sodium hypochlorite to one of the mixing operations wherein the sodium hypochlorite is in part consumed, separating the resulting aqueous solution from the oil in the succeeding settling operation, supplying the resulting aqueous solution of relative increased alkalinity to a mixing operation preceding that to which the aqueous solution is first supplied, and separating the aqueous solution from the oil in the succeeding settling operation.

2. An improved method of refining hydrocarbon oils, which comprises flowing a stream of the oil through a succession of mixing and settling operations, supplying an aqueous solution containing sodium hydroxide and sodium hypochlorite to one of the mixing operations wherein the sodium hypochlorite is in part consumed, separating the resulting aqueous solution from the oil in the succeeding settling operation, supplying the resulting aqueous solution of relative increased alkalinity to a mixing operation preceding that to which the aqueous solution is first supplied, and separating the aqueous solution from the oil in the succeeding settling operation.

3. An improved method of refining hydrocarbon oils, which comprises flowing a stream of the oil through a succession of mixing and settling operations, supplying an alkaline aqueous solution of hypochlorite to one of the mixing operations wherein the hypochlorite is in part consumed, separating the resulting aqueous solution from the oil in the succeeding settling operation, supplying the resulting aqueous solution relative increased alkalinity to a mixing operation preceding that to which the aqueous solution is first supplied, and separating the aqueous solution from the oil in the succeeding settling operation.

4. An improved method of refining hydrocarbon oils, which comprises flowing a stream of the oil through a succession of mixing and settling operations, supplying an aqueous alkaline solution of sodium hypochlorite to one of the mixing operations wherein the sodium hypochlorite is in part consumed, separating the resulting aqueous solution from the oil in the succeeding settling operation, and progressively re-introducing the resulting aqueous of relative increased alkalinity solution in a plurality of successively preceding mixing operations after separation from the oil in settling operations succeeding the mixing operation to which it is supplied.

5. An improved method of refining hydrocarbon oils, which comprises flowing a stream of the oil through a succession of mixing and settling operations, supplying an aqueous alkaline solution of sodium hypochlorite containing about 10 grams of available chlorine per liter and about 10 grams of free sodium hydroxide per liter to one of the mixing operations wherein the sodium hypochlorite is in part consumed, separating the resulting aqueous solution from the oil in the succeeding settling operation, supplying the resulting aqueous solution of relative increased alkalinity to a mixing operation preceding that to which the aqueous solution is first supplied, and separating the aqueous solution from the oil in the succeeding settling operation.

In testimony whereof I affix my signature.

HARRISON OAKS PARKER.

CERTIFICATE OF CORRECTION.

Patent No. 1,627,338. Granted May 3, 1927, to

HARRISON OAKS PARKER.

It is hereby certified that error appears in the printed specification of the above numbered patent requiring correction as follows: Page 3, line 68, claim 3, after the word "solution" insert the word "of"; same page, line 85, claim 4, strike out the word "solution" and insert the same to follow after the word "aqueous" in line 84; and that the said Letters Patent should be read with these corrections therein that the same may conform to the record of the case in the Patent Office.

Signed and sealed this 7th day of June, A. D. 1927.

Seal.

M. J. Moore,
Acting Commissioner of Patents.